United States Patent [19]
Rao

[11] Patent Number: 6,130,389
[45] Date of Patent: Oct. 10, 2000

[54] HOUSING FOR AN ELECTRIC SWITCH

[75] Inventor: Chepur P. Rao, North Kingstown, R.I.

[73] Assignee: Tower Manufacturing Corporation, Providence, R.I.

[21] Appl. No.: 09/320,182

[22] Filed: May 26, 1999

[51] Int. Cl.⁷ ...................................................... H01H 9/02
[52] U.S. Cl. ...................................................... 200/296
[58] Field of Search .................... 200/5 R, 11 R, 200/11 C, 11 B, 11 G, 293, 295, 296, 336, 1 C, 303, 307; 361/728–730, 735, 837, 807–809

[56] References Cited

U.S. PATENT DOCUMENTS

| | | | |
|---|---|---|---|
| 3,339,050 | 8/1967 | Mitchell | 200/168 |
| 4,080,522 | 3/1978 | Schimmels | 200/295 |
| 5,072,078 | 12/1991 | Rao et al. | 200/11 R |
| 5,750,947 | 5/1998 | Rao et al. | 200/6 R |
| 5,810,161 | 9/1998 | Carroll, Jr. | 200/296 |

OTHER PUBLICATIONS

Tower Manufacturing Corporation, 3000 Series Rotary Snap Switches Catalog, pp. 1–12, Published before filing date of this appln.

*Primary Examiner*—Michael Friedhofer
*Attorney, Agent, or Firm*—Kriegsman & Kriegsman

[57] ABSTRACT

A housing for an electric switch includes a recessed base and a cover member. The cover member is constructed to include a hook fastener, a latch fastener, a first pair of clip fingers and a second pair of clip fingers. The hook fastener and latch fastener serve to enable the electric switch to be easily and quickly mounted on a wall in a device with which the electric switch is to be used while the first and second pair of clip fingers serve to hold the hook and latch fasteners tightly in place on the wall of the device when so mounted.

17 Claims, 2 Drawing Sheets

HOUSING FOR AN ELECTRIC SWITCH

BACKGROUND OF THE INVENTION

The present invention relates generally to electric switches and, more particularly, to housings for electric switches.

Electric switches are well-known in the art and are widely used to control electric motors, heating elements and other components in a number of different devices. For example, electric switches are particularly useful in controlling electric motors in small appliances such as food processors, slow cookers, blenders, fans and the like, and controlling heating elements in small appliances, such as portable heaters, ovens and the like.

Electric switches for use with small appliances and other types of devices often include a housing having a recessed base and a cover member, input and output terminals on the recessed base and one or more movable contacts within the housing. A movable actuator usually extends out of the housing through an opening formed in the cover member. In some electric switches the cover member is constructed so that the electric switch can be mounted directly onto a wall of the device with which the electric switch is to be used while in other electric switches a mounting plate constructed so that the electric switch can be mounted onto the wall of the device is mounted over the cover member.

In U.S. Pat. No. 5,072,078 to C. P. Rao et al, there is disclosed a rotary electric switch for small appliances which includes a base and a cover member. The cover member has on its outer surface an integral square projection having a hub extending therefrom and a snap-in type arrangement for mounting the electric switch on to the appliance. The snap-in mounting arrangement includes a first latch member disposed between a first pair of clip fingers and a second latch member disposed between a second pair of clip fingers. In use, the cover member is mounted on a wall of the appliance with which the switch is to be used. Specifically, the wall of the appliance includes openings configures to snugly receive the square projection and the latch members therethrough whereby the wall is actually clamped between each latch member and its associate clip fingers.

Another housing for electric switches which is well known and widely used in the art includes a cover member having hook mounting fastener and a screw mounting hole for attaching the electric switch to the appliance. Specifically the hook is mounted into an opening in a wall of the appliance and a screw is inserted through a hole in the wall into the screw mounting hole.

In U.S. Pat. No. 5,750,947 to C. P. Rao et al, there is disclosed a rotary electric switch which includes a housing having a cover member which includes a pair of mounting holes to enable the switch to be mounted onto the wall of an appliance with which the switch is to be used, such as by a pair of screws.

Another type of housing for electric switches which is well known and widely used in the art includes a cover member having threaded bushing for mounting the electric switch onto a wall of an appliance with which the switch is to be used.

The different types of housings disclosed above are widely used in commerce. However, it has been found that electric switches which comprise housings having mounting structures of the types described above are not easily and/or quickly installable, in some instances, onto a wall of a device.

SUMMARY OF THE INVENTION

It is an object of the present invention to provide a new and improved housing for an electric switch for devices such as but not exclusively limited to small appliances.

It is another object of the present invention to provide a housing as described above which includes a recessed base and a cover member.

It is yet another object of the present invention to provide a housing as described above which can be easily and quickly installed onto the device with which the electric switch is to be used.

It is still another object of the present invention to provide a housing as described above which can be easily and inexpensively mass produced, which has a minimal number of parts, which is limited in size and which can be very easily used.

It is a further object of this invention to provide a housing for an electric switch having a new and improved construction for mounting the electric switch onto a device with which the electric switch is to be used.

Accordingly, there is provided a housing for an electric switch comprising a recessed base and a cover member, the cover member being mounted on said recessed base, said cover member having thereon a hook fastener and a latch fastener for enabling the electric switch to be easily and efficiently mounted onto a device with which the electric switch is to be used.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration an embodiment for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate embodiments of the invention and, together with the description, serve to explain the principles of the invention. In the drawings wherein like reference numerals represent like parts.

DETAILED DESCRIPTION OF A PREFERRED EMBODIMENT

Figure 1:
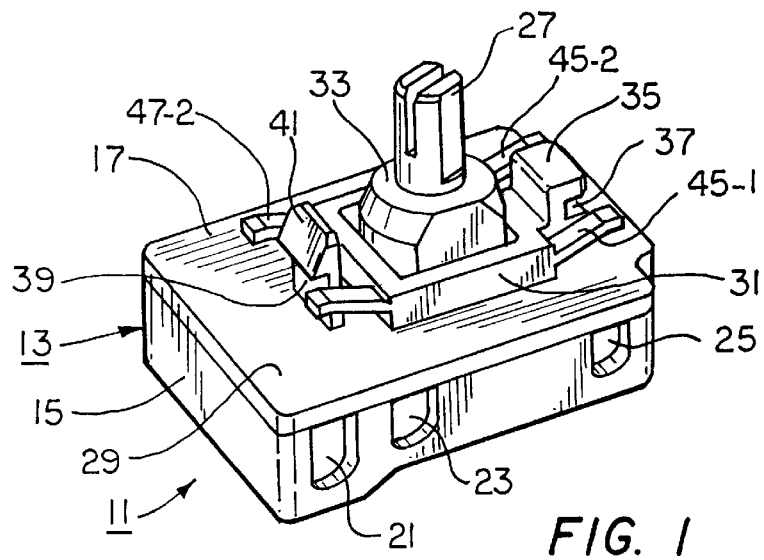
FIG. 1 is a perspective view of an electric switch including a housing constructed according to the teachings of the present invention.
Figure 2:
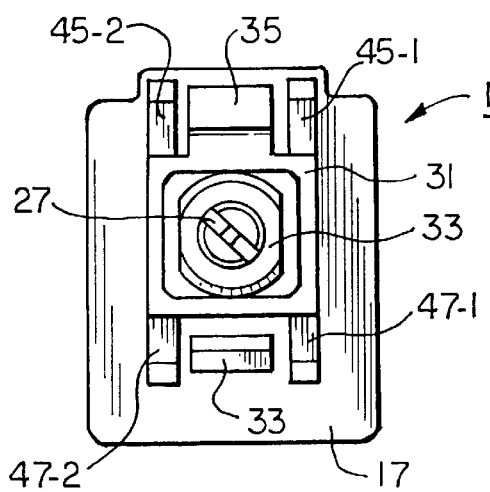
FIG. 2 is a top view of the electric switch shown in FIG. 1.
Figure 3:
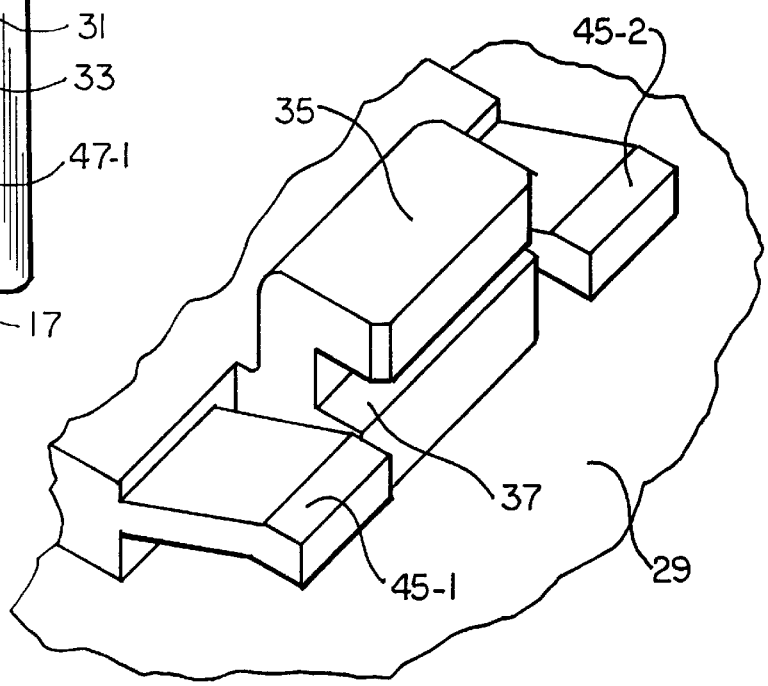
FIG. 3 is an enlarged fragmentary perspective view showing the hook fastener and its associated clip fingers and cover in the housing in the electric switch shown in the FIG. 1.
Figure 4:
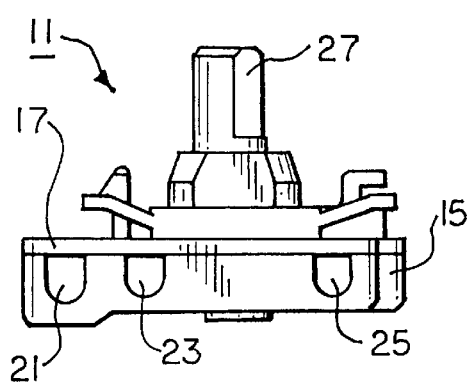
FIG. 4 is a side side view of the electric switch shown in FIG. 1.
Figure 5:
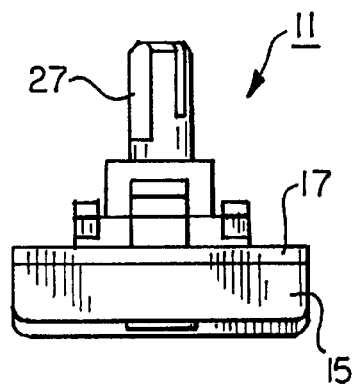
FIG. 5 is a back view of the electric switch shown in FIG. 1.

Referring now to the drawings, and first to FIGS. 1–6, there is shown in FIG. 1 an electric switch having a housing constructed according to this invention, the electric switch being represented generally by reference numeral 11. A top view of electric switch 11 is shown in FIG. 2. Switch 11 as shown in FIG. 1 is a rotary type electric switch of the type which can be used with a number of small appliances such as food processors, slow cookers, blenders and fans.

Switch 11 comprises a generally rectangularly shaped hollow housing 13. Housing 13 includes a recessed base 15 and a cover member 17, both being constructed of molded plastic so as to be electrically nonconductive. Recessed base 15 and cover member 17 are fixedly attached together by any suitable means, such as by ultrasonic welding.

Recessed base 15 is generally rectangularly shaped and includes sidewall 19 having a plurality of wire receiving openings 21, 23 and 25.

Switch 11 further comprises a one-piece actuating shaft 27 constructed out of a rigid plastic material.

It should be noted that the present invention relates to the construction of housing 13, the internal components of switch 11 are not shown and do not constitute a part of the present invention. Also, the invention is not limited to rotary type switches but rather is applicable to other types of switches, such as for example push button switches. Also, the number and arrangement of wire receiving openings in the recessed base portion of the housing and the internal components inside the switch could be such as shown in U.S. Pat. No. 5,750,947, which patent is incorporated herein by reference.

The novelty of the present invention lies in the particular construction of cover member 17 which enables switch 11 to be mounted easily and efficiently onto a wall of a device with which switch 11 is to be used.

Specifically, cover member 17 is generally rectangular shaped and includes a top surface 29. A square shaped projection 31 extends upward form top surface 29. A bushing, or hub, 33 having a central opening is integrally formed and extends upward from projection 31, the central opening 33 being sized and shaped to enable shaft 27 to extend therethrough. An integrally formed hook fastener 35 having an elongated wall engaging slot 37 extends upward from top surface 29 and projection 31. An integrally formed latch, or snap-in, fastener 39 which is shaped to include a latching shoulder 41 extends upward from top surface 29 of cover member 17.

Cover member 17 further comprises a first pair of clip fingers 45-1 and 45-2 integrally formed on projection 31 on opposite sides of hook fastener 35. Additionally, cover member 17 comprises a second pair of clip fingers 47-1 and 47-2 internally formed on projection 31 on opposite sides of latch fastener 39.

Figure 7:
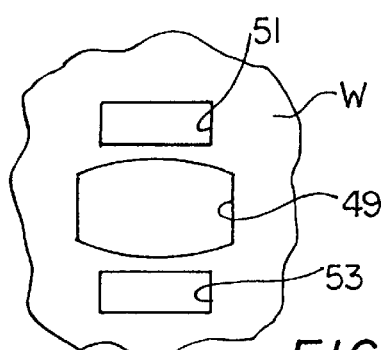
FIG. 7 is a fragmentary plan view of a wall of a device on which the electric switch in FIG. 1 can be mounted.

In use, switch 11 is mounted onto wall W of a device, the wall W, as shown in FIG. 7 having a central opening 49 configured to snugly receive bushing 33 in cover member 17, a first fastener opening 51 sized and shaped to enable a portion of hook fastener 35 to be disposed therethrough and a second fastener opening 53 sized and shaped to enable a portion of latch fastener 39 to be disposed therethrough. However, it is to be understood that switch 11 could alternatively be mounted on different types of mounting walls, which have different configurations of openings, without departing from the spirit of the present invention.

Figure 6:
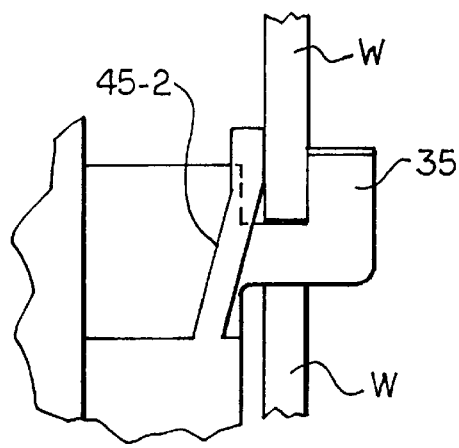
FIG. 6 is a fragmentary side view showing how the hook fastener in the electric switch in FIG. 1 engages a wall in a device with which it is to be used.

Hook fastener 35 is first inserted partially through the first fastener opening 51 in the wall W so that the wall W is disposed within slot 37 of hook fastener 35 as shown in FIG. 6 with wall W seated in slot 37 and sandwiched between top wall 47 of slot 37 and first pair of clip fingers 43. Bushing 33 is then inserted through the central opening in wall W. Finally, latch rfastener 39 is snap-fit through the second fastener opening in wall W, with latching shoulder 41 and second pair of clip fingers 45 disposed on opposite sides of the wall W. As can be appreciated, clip fingers 45 and 47 serve to hold hook fastener 35 and latch fastener 39, respectively, tightly within first opening 51 and second opening 53 in wall W.

As can be appreciated, the particular construction of cover member 17 facilitates the installation of switch 11 onto the mounting panel of the device with which switch 11 is to be used. In particular, utilizing the particular combination of hook fastener 35 and latch fastener 41 and the associated clip fingers 43 and 45 together serve to simplify the manner and ease in which switch 11 is installed onto wall W, which is a principal object of the present invention.

Figure 8:
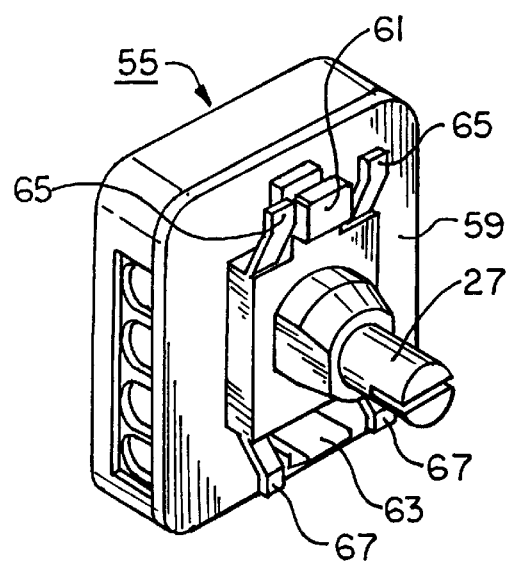
FIG. 8 is a perspective view of another electric switch including a housing constructed according to the teachings of the present invention.

In FIG. 8 there is shown another electric switch 55 constructed according to this invention. Switch 55 includes a housing comprising a base 57 and a cover member 59. Base 55 differs from base 15 in that it has openings arranged to receive a ribbon cable. Cover member 59 is similar to cover member 17 in that it includes a hook fastener 61, a latch fastener 61, a latch fastener 63 and clip fingers 65 and 67.

Electric switch 55 differs from the electric switch in U.S. Pat. No. 5,072,078 only in that cover member 59 includes a hook fastener and a latch fastener rather than two latch fasteners.

It should be noted that the hook and snap type mounting arrangement of this invention is particularly designed for use in devices such as slow cookers that use a thin round outer wrapper or wall to which the switch is mounted. In addition, to reduce the assembly time involved in assembling the switch to the wrapper, this particular type of mounting minimized the distortion and bending of the wrapper during the switch assembly.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A housing for an electric switch for use in a device, the device having a wall onto which the electric switch can be mounted, the housing comprising:
 a). a base, and
 b). a cover member mounted on said base, said cover member including,
    i). a top surface;
    ii). a hook fastener extending up from said top surface; and
    iii). a latch fastener extending up from said top surface;
    iv). said hook fastener and said latch fastener serving to mount said electric switch onto said wall of said device.

2. The housing as claimed in claim 1 wherein said cover member further comprises a first pair of clip fingers for use in holding said hook fastener tightly in place on said wall.

3. The housing as claimed in claim 2 wherein said hook fastener is shaped to define a slot for engaging said wall.

4. The housing as claimed in claim 3 wherein said latch fastener comprises a latching shoulder for engaging said wall.

5. The housing as claimed in claim 4 wherein said cover member further comprises a second pair of clip fingers for use in holding said latch fastener tightly in place on said wall.

6. The housing as claimed in claim 5 wherein the cover member is made of plastic.

7. The housing as claimed in claim 6 wherein said base is recessed and is made of plastic.

8. The housing as claimed in claim 7 wherein said cover member is a unitary structure.

9. The housing as claimed in claim 8 wherein said cover member is generally rectangular in shape.

10. A cover member for a housing for an electric switch, said cover member comprising:

a. a body of material having a top surface, b. a hook fastener extending up from said top surface, and c. a latch fastener extending up from said top surface, d. said hook fastener and said latch fastener serving to mount said electric switch onto a device with which the electric switch is to be used.

11. A cover member as claimed in claim 10 wherein said cover member further comprises a plurality of clip fingers for holding said hook fastener and said latch fastener onto a wall of said device with which said electric switch is to be used.

12. The cover member as claimed in claim 11 wherein said hook fastener is shaped to define a slot for engaging said wall.

13. The cover member as claimed in claim 12 wherein said latch fastener comprises a latching shoulder.

14. The cover member electric switch as claimed in claim 13 wherein said plurality of clip fingers comprises a first pair of clip fingers which are disposed on opposite sides of said hook fastener and second pair of clip fingers which are disposed on opposite sides of said latch fastener.

15. The cover member claimed in claim 14 wherein the cover member is made of plastic.

16. The cover member as claimed in claim 15 wherein said cover member is rectangular in shape.

17. The cover member as claimed in claim 16 wherein said cover member further comprises a bushing into which an actuating member can be slidably mounted.

* * * * *